US007054810B2

(12) United States Patent
Gao et al.

(10) Patent No.: US 7,054,810 B2
(45) Date of Patent: May 30, 2006

(54) FEATURE VECTOR-BASED APPARATUS AND METHOD FOR ROBUST PATTERN RECOGNITION

(75) Inventors: Yuqing Gao, Mount Kisco, NY (US); Michael A. Picheny, White Plains, NY (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 09/968,051

(22) Filed: Oct. 1, 2001

(65) Prior Publication Data

US 2002/0152069 A1 Oct. 17, 2002

Related U.S. Application Data

(60) Provisional application No. 60/238,841, filed on Oct. 6, 2000.

(51) Int. Cl.
*G10L 15/00* (2006.01)
(52) U.S. Cl. ..................................... 704/231
(58) Field of Classification Search .............. 704/231; 382/28
See application file for complete search history.

(56) References Cited

U.S. PATENT DOCUMENTS 6,535,641 B1 * 3/2003 Baggenstoss ............... 382/228

OTHER PUBLICATIONS

"Using Multiple Time Scales in a Multi-Stream Speech Recognition System", S. Dupont et. al., Eurospeech '97, Greece, Sep. 1997 (proceedings pp. 3-6).

"Data-derived Non-linear Mapping for Feature Extraction in HMM", Proceedings of the Workshop on Automatic Speech Recognition and Understanding, Colorado, Dec. 1999, H. Hermansky et al.

"Heterogenious Measurements and Multiple Classifiers for Speech Recognition" A. Halberstadt et al., ICSLP '98 (Sydney, Australia 1998).

(Continued)

*Primary Examiner*—David Hudspeth
(74) *Attorney, Agent, or Firm*—Ido Tuchman; Anne Dougherty (57) ABSTRACT

N sets of feature vectors are generated from a set of observation vectors which are indicative of a pattern which it is desired to recognize. At least one of the sets of feature vectors is different than at least one other of the sets of feature vectors, and is preselected for purposes of containing at least some complimentary information with regard to the at least one other set of feature vectors. The N sets of feature vectors are combined in a manner to obtain an optimized set of feature vectors which best represents the pattern. The combination is performed via one of a weighted likelihood combination scheme and a rank-based state-selection scheme; preferably, it is done in accordance with an equation set forth herein. In one aspect, a weighted likelihood combination can be employed, while in another aspect, rank-based state selection can be employed. An apparatus suitable for performing the method is described, and implementation in a computer program product is also contemplated. The invention is applicable to any type of pattern recognition problem where robustness is important, such as, for example, recognition of speech, handwriting or optical characters under challenging conditions.

44 Claims, 7 Drawing Sheets

OTHER PUBLICATIONS

"Spectral Subband Centroid Features for Speech Recognition," K. Paliwal, ICASSP '98, Seattle, Washington, May 1998 (proceedings pp. 617-620).

"Tandem Connectionist Feature Extraction for Conventional HMM Systems" ICASSP 2000, Istanbul, Turkey, May 2000, H. Hermansky et al.

"Unified Decoding and Feature Representation for Improved Speech Recognition," L. Jiang and X. Huang, Eurospeech '99, Budapest, 1999 (proceedings pp. 1331-1334).

"Non-stationary Multi-Channel (Multi Stream) Processing Towards Robust and Adaptive ASR," H. Bourlard, pp. 1-10 of the Proceedings of the Workshop on Robust Methods for Speech Recognition in Adverse Conditions, which was held in Finland in 1999.

"Robust -methods for using context-dependent features and models in a continuous speech recognizer," Bahl, et al., ICASSP 1994, vol. 1, pp. 533-536.

"Discriminative Model Combination," P. Beyerlin, ICASSP '98, pp. 481-484, Seattle, May 1998.

"Enchanced Likelihood Computation Using Regression," P. DeSouza et al., Eurospeech '99, pp. 1699-1702, Budapest, 1999.

"A Stochastic Segment Model for Phoneme based Continuous Speech Rocognition" by Ostendorf and Roukos, IEEE Transactions on Acoustics, Speech and Signal Processing, v. 37, n.12, Dec. 1989, at pp. 1857-1869.

"Multi-stream Speech Recognition: Ready for Prime Time?," A. Janin et al., Eurospeech '99 pp. 591-594, Hungary 1999.

* cited by examiner

FEATURE VECTOR-BASED APPARATUS AND METHOD FOR ROBUST PATTERN RECOGNITION

CROSS-REFERENCE TO RELATED APPLICATIONS

This application claims the benefit of U.S. Provisional Application Ser. No. 60/238,841 filed Oct. 6, 2000.

BACKGROUND OF THE INVENTION

1. Field of the Invention

The present invention relates to pattern recognition, and more particularly relates to an apparatus and method suitable for robust pattern recognition, such as, for example, robust recognition of speech, handwriting or optical characters under challenging conditions.

2. Brief Description of the Prior Art

In the field of pattern recognition, different types of feature vectors may be used to model a given set of observation vectors. For example, in the field of speech recognition, different types of spectral-based feature vectors can be employed, such as mel-frequency cepstral vectors, perceptual linear predictive coefficients (PLP), maximum-likelihood based linearly transformed features, formant-based features, and the like. The acoustic models which are used to model these different feature spaces may produce different types of decoding errors, and their accuracy for classifying vowels, fricatives, and other consonants may vary. Furthermore, the type of signal processing scheme which is used (e.g., LDA, PLP, Cepstra, factor analysis, transformed features, etc.) may determine the robustness of these models under varying noise conditions. Similar comments would apply to other types of pattern recognition problems, such as handwriting recognition or optical character recognition under conditions which are challenging for those types of recognition.

In the past, in the field of speech recognition, multi-scale systems have been explored where each stream operates on different time windows. Such multi-scale systems have been discussed in the paper "Using Multiple Time Scales in a Multi-Stream Speech Recognition System" as authored by S. Dupont et al., and presented at Eurospeech '97, held in Greece September 1997 (proceedings pages 3–6). In the paper "Data-derived Non-linear Mapping for Feature Extraction in HMM," as set forth in the Proceedings of the Workshop on Automatic Speech Recognition and Understanding held in Colorado in December 1999, authors H. Hermansky et al. trained an MLP to map the feature spaces to the log-likelihoods of phonemes and the combination scheme involved the averaging of the features prior to orthogonalization. In the NIST-based ROVER scheme, a voting mechanism is used after an initial decoding pass to combine the best output from each model. In the paper "Heterogenious Measurements and Multiple Classifiers for Speech Recognition," by A. Halberstadt et al., presented at ICSLP '98 (Sydney, Australia 1998), a hierarchical architecture for combining classifiers for speech recognition was presented.

Selection of acoustic features for robust speech recognition has been the subject of research for several years. In the past, algorithms which use feature vectors from multiple frequency bands, or employ techniques to switch between multiple feature streams, have been reported in the literature to handle robustness under different acoustic conditions. The former approach is discussed in a paper by K. Paliwal, entitled "Spectral Subband Centroid Features for Speech Recognition," presented at the ICASSP '98 in Seatle, Wash., May 1998 (proceedings pages 617–20). The latter approach is set forth in a paper by L. Jiang entitled "Unified Decoding and Feature Representation for Improved Speech Recognition," which was presented at Eurospeech '99 in Budapest, 1999 (proceedings pages 1331–34).

In order to increase speech recognition accuracy, the use of information content in features extracted from Bark-spaced multiple critical frequency bands of speech has been proposed in the aforementioned paper by Paliwal, and in the paper by H. Hermansky et al. entitled "Tandem Connectionist Feature Extraction for Conventional HMM Systems" as presented at ICASSP 2000 in Istanbul, Turkey in May 2000. Typically, most of these feature streams contain complimentary information and an efficient combination of these streams would not only result in increased recognition accuracy, but would also serve as a technique to select the feature stream that best represents the acoustics at the given time frame or segment. The overall performance of the final acoustic model, which is a combination of acoustic models based on several features spaces, depends on how well the error patterns from these streams compliment one another and how much redundant information they possess. This is further discussed in the paper by H. Bourlard entitled "Non-stationary Multi-Channel (Multi Stream) Processing Towards Robust and Adaptive ASR," at pages 1–10 of the Proceedings of the Workshop on Robust Methods for Speech Recognition in Adverse Conditions, which was held in Finland in 1999. In some cases, even when the performance of one of the streams is not so robust or is far worse than the best system, it may contain hidden characteristic information that becomes more valuable when the two streams are merged.

The various prior art schemes may substantially increase the computational load during decoding, or may not optimally combine the different feature vectors, or select the best from among multiple feature vectors.

In view of the foregoing, there is a need in the prior art for an apparatus and method for robust pattern recognition which permits computationally efficient combination of multiple feature spaces. Furthermore, it would be desirable if such apparatus and method could provide both a weighted, normalized maximum likelihood combination scheme and a rank-based maximum likelihood combination scheme.

SUMMARY OF THE INVENTION

The present invention, which addresses the needs identified in the prior art, provides a method for robust pattern recognition, which includes the steps of generating N sets of feature vectors from a set of observation vectors which are indicative of a pattern which it is desired to recognize, and then combining the N sets of feature vectors in a manner to obtain an optimized set of feature vectors which best represents the pattern. The feature vectors can be represented as $x_1, x_2, \ldots x_N$. At least one of the sets of feature vectors should be different than at least one other of the sets of feature vectors, and should be pre-selected for purposes of containing at least some complementary information with regard to the at least one other of the sets of feature vectors. The combination of the feature vectors is performed via a weighted likelihood combination scheme or a rank based state selection scheme; preferably, it is done in accordance with Equation (1) set forth hereinbelow. In the weighted likelihood scheme, a set of weights are assigned to corresponding likelihoods from each of the N sets of feature vectors. In the rank-based scheme, one selects that one of the N sets of feature vectors for which a corresponding one of the likelihoods has a highest rank.

The present invention also provides an apparatus for robust pattern recognition. The apparatus includes a feature vector generator which generates the aforementioned N sets of feature vectors from the set of observation vectors which are indicative of the pattern which it is desired to recognize. The apparatus also includes a feature vector combiner which combines the N sets of feature vectors in a manner to obtain an optimized set of feature vectors which best represents the pattern, as described in the foregoing paragraph.

The present invention still further provides a program storage device readable by machine, tangibly embodying a program of instructions executable by the machine to perform method steps for robust pattern recognition, in accordance with the method just described.

Considering in particular the applicability of the present invention to speech recognition, it will be appreciated that acoustic models built out of different feature sets produce different kinds of recognition errors. In one aspect of the present invention, a likelihood-based scheme to combine the acoustic feature vectors from multiple signal processing schemes within the decoding framework, in order to extract maximum benefit from these different acoustic feature vectors and models, is provided. As noted, the technique can be applied to other pattern recognition fields, such as OCR, handwriting recognition, and the like. Again, considering applicability to speech recognition, a key idea behind this approach is to pick the set of features which classifies a frame of speech accurately with no a priori information about the phonetic class or acoustic channel that this speech comes from. Two methods of merging any set of acoustic features, such as formant-based features, cepstral feature vectors, PLP features, LDA features, and the like, are set forth herein. In one aspect, a weighted set of likelihoods obtained from the several alternative feature sets is used. In another aspect, one can select the feature space which ranks the best when used in a rank-based recognizer.

The merging techniques of the present invention can provide an impressive reduction in error rate, for example, between 8% to 15% relative across a wide variety of wide-band, clean and noisy large vocabulary continuous speech recognition tasks. Much of the gain is believed to be due to reduced insertion and substitution errors. Employing the approach of the present invention, it has been found possible to achieve improved acoustic modeling without increasing the number of parameters. That is, for example, two 40K Gaussian systems, when merged, perform better than a single 180K Gaussian system trained on the better of the two feature spaces. Techniques of the present invention are capable of implicitly switching acoustic models dynamically during decoding, at the frame, phone, or syllable level, such that the feature space which best models the acoustics at any given time frame can always be used.

As noted, the present invention provides both a weighted, normalized likelihood combination approach to maximum-likelihood combination, and a rank-based combination scheme for maximum-likelihood based combination. Selection techniques of the present invention do not increase the computational load during decoding. When several feature streams are decoded separately and combined thereafter (multi-pass decoding strategy), the decoding time increases linearly with the number of input streams. Accordingly, it is possible to considerably reduce computational requirements while maintaining good robustness to changing acoustic conditions and improving recognition accuracy. The strategy of the present invention provides relative improvements over the best performing system in all of the test sets used, and maximum-likelihood is employed as the criterion to select the best model. Accordingly, with the present invention it is possible to increase clean speech performance by optimally selecting the feature which best represents a frame of speech, without increasing the number of system parameters. It should be appreciated that, in the foregoing, the mention of a frame of speech or a given time frame has particular applicability to speech recognition applications of the present invention, inasmuch as the basic dimension in such applications is time. However, it will be appreciated that in handwriting recognition, the basic dimensions are spatial, so one might look, for example, at a pixel or an array of two by two pixels. In a broad view, one refers to observation vectors which could be frames of speech, pixels of an image, and the like.

These and other features and advantages of the present invention will be appreciated by reading the following specification, taken in conjunction with the accompanying drawings, and the scope of the invention will be set forth in the appended claims.

DETAILED DESCRIPTION OF THE INVENTION

Note that, as used herein, the terms "state" and "class" are used interchangeably.

Figure 1:
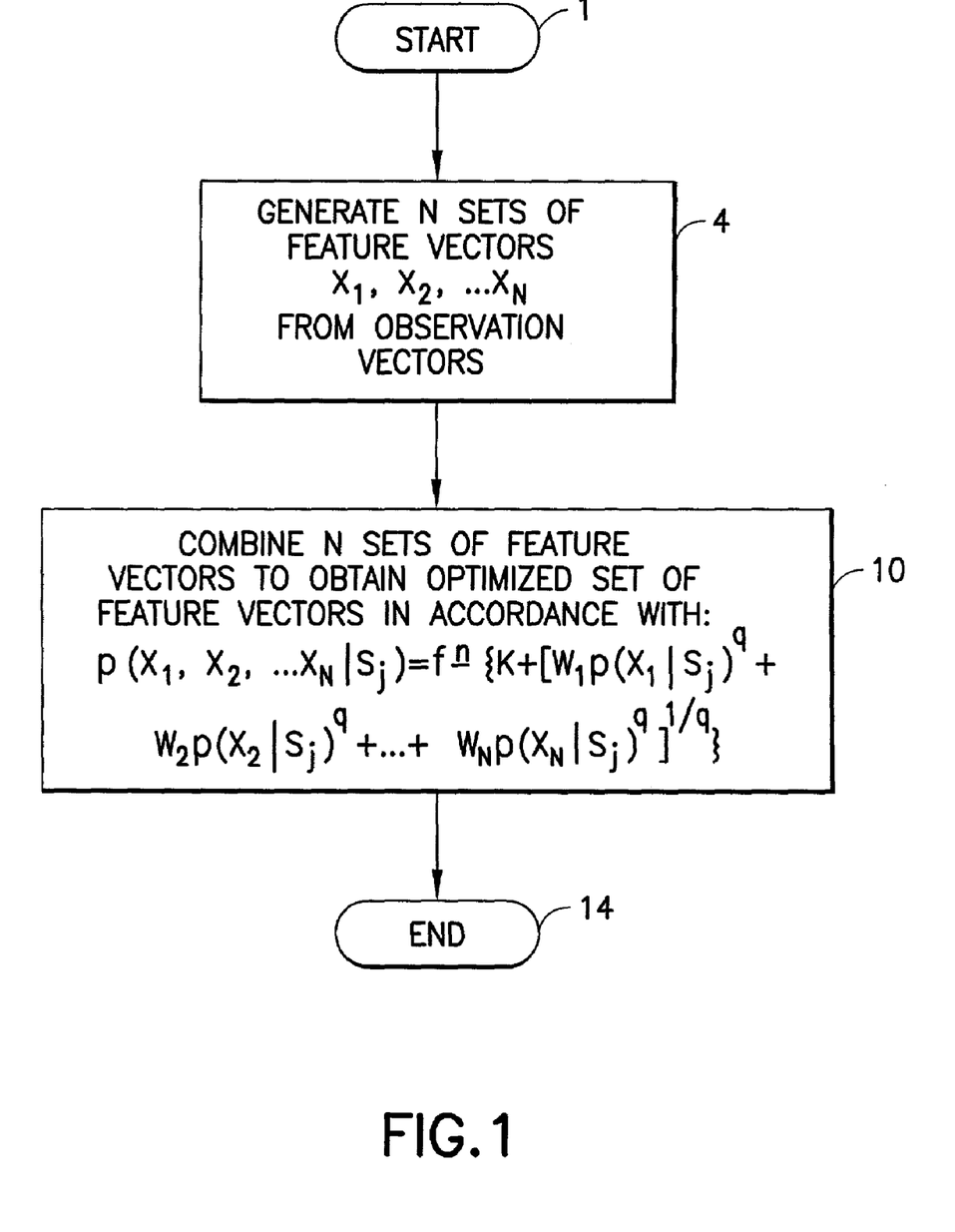
FIG. 1 is a flow chart of a method for robust pattern recognition in accordance with the present invention.

Reference should now be had to FIG. 1 which depicts a flow chart of a method for robust pattern recognition in accordance with the present invention. After starting at block 1, in a first method step, as shown in block 4, N sets of feature vectors $x_1, x_2, \ldots x_N$ can be generated from a set of observation vectors which are indicative of a pattern which it is desired to recognize. The pattern could be, for example, human speech, handwriting, or optical characters. At least one of the sets of feature vectors should be different than at least one other of the sets of feature vectors and should be preselected so that it contains at least some complementary information with regard to one of the other feature vectors.

The method also includes the step of combining the N sets of feature vectors in a manner to obtain an optimized set of feature vectors which best represents the pattern. The combining is performed via one of a weighted likelihood combination scheme and a rank-based state selection scheme. The combining can preferably be performed in accordance with the following equation:

$$p(x_1, x_2, \ldots x_N | s_j) = f\_^n \{ K + [w_1 p(x_1|s_j)^q + w_2 p(x_2|s_j)^q + \ldots + w_N p(x_N|s_j)^q]^{1/q} \} \quad (1)$$

where:

$f\_^n$ is one of an exponential function exp( ) and a logarithmic function log( ), $s_j$ is a label for a class j, N is greater than or equal to 2, $p(x_1, x_2, \ldots x_N|s_j)$ is the conditional probability of feature vectors $x_1, x_2, \ldots x_N$ given that they are generated by the class j, K is a normalization constant, $w_1, w_2, \ldots w_N$ are weights assigned to $x_1, x_2, \ldots x_N$ respectively according to confidence levels therein; and q is a real number corresponding to a desired combination function.

The preferred form of combination, via Equation (1), is shown at block 10, while the conceptual end of the method is indicated at block 14.

Figure 2:
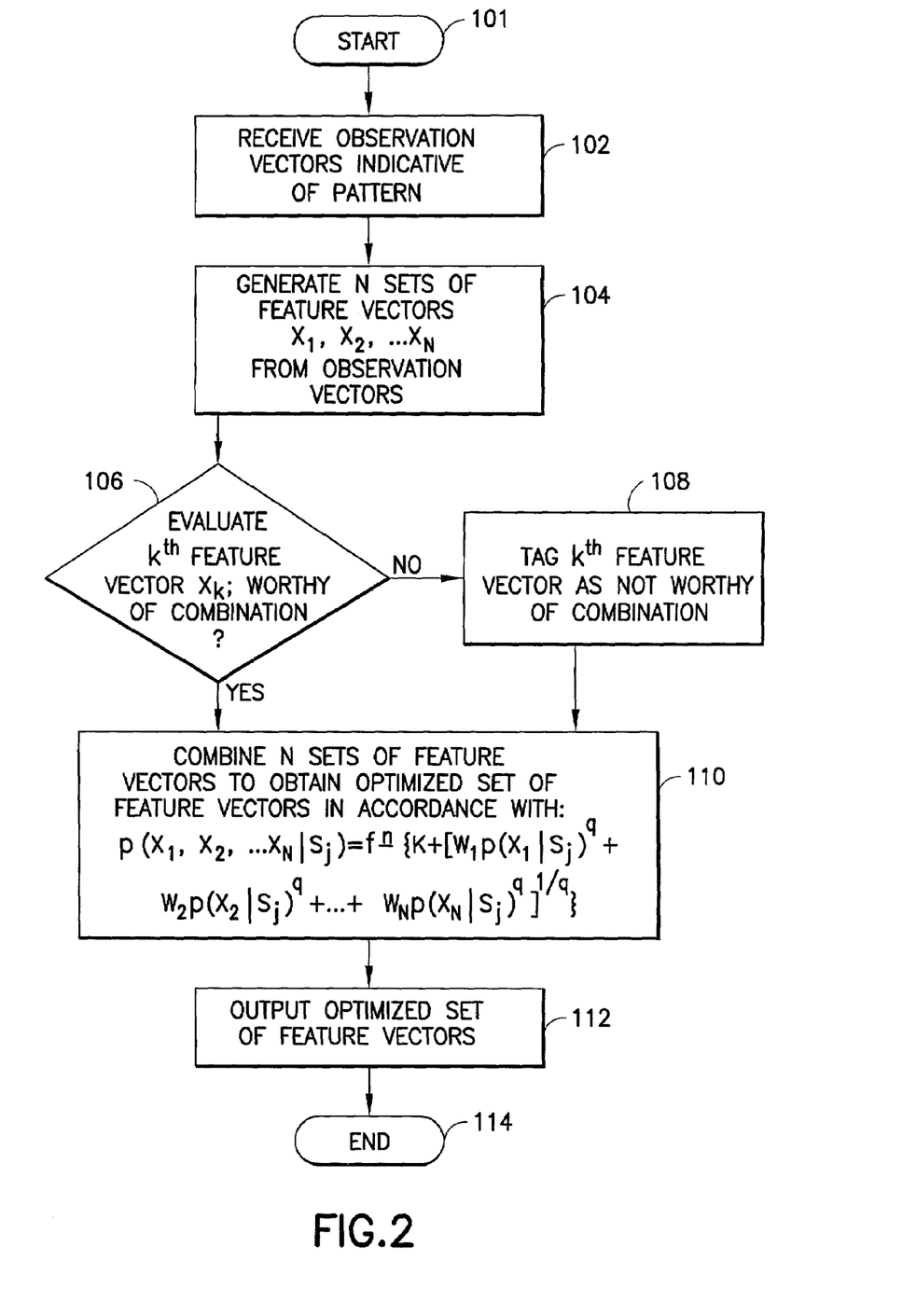
FIG. 2 is a flow chart similar to FIG. 1 showing certain optional, more detailed steps which can be present in some forms of the present invention.

Reference should now be had to FIG. 2, which shows an embodiment of the inventive method similar to that depicted in FIG. 1, but having additional, optional steps, wherein items similar to FIG. 1 have received the same reference numeral incremented by 100. As suggested at block 102, the observation vectors indicative of the pattern could be received after the start of the process. Further, as suggested at block 112, following the combination of the N sets of feature vectors, an optimized set of feature vectors can be output (block 112). It is to be appreciated that the optimized set of feature vectors could be stored for further use, or could be directly sent to a suitable pattern recognition engine, such as a speech recognition engine, handwriting recognition engine, or optical character recognition engine, as are well known in the art.

Optionally, before the step of combining the N sets of feature vectors, given ones of the feature vectors, $x_k$, can be evaluated via information theory-based techniques to determine whether a given one of the feature vectors contains valuable information and should be combined. Still referring to FIG. 2, in decision block 106, the $k^{th}$ feature vector $x_k$ can be evaluated to determine if it is worthy of combination. If so, it can be combined with other feature vectors; if not it can be tagged, per block 108, indicating that it is not worthy of being combined. It should be understood that the combination of N sets of feature vectors referred to in block 110 should be broadly understood to include the potential combination of all the feature vectors, or the selective combination of only those which are deemed worthy of combination. Further, tagging of unworthy vectors should be broadly understood to include tagging with a one-bit flag, setting the corresponding weight to substantially or exactly zero, or another reduced value, or any other method which conveys the desired information.

Figure 3:
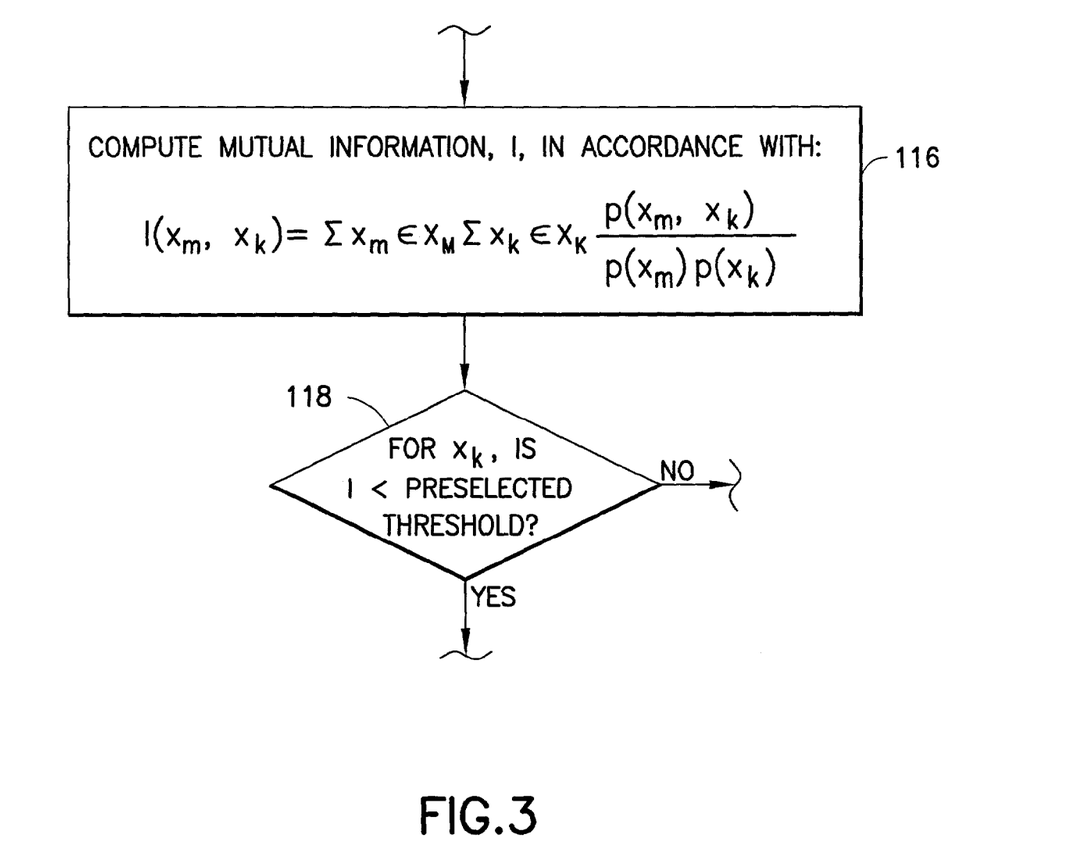
FIG. 3 is a partial flow chart showing one method for evaluating feature vectors in accordance with the present invention.

Reference should now be had to FIG. 3, which depicts a computation block 116 and a decision block 118 which can optionally be used to perform the evaluation of decision block 106 in FIG. 2. As shown at block 116, the evaluating step 106 can include a first sub-step of computing mutual information, I, in accordance with the equation:

$$I(x_m, x_k) = \Sigma\Sigma((p(x_m, x_k))/(p(x_m)p(x_k))) \quad (2)$$

where:

the first summation is for $x_m \in X_M$ and the second summation is for $x_k \in X_K$, $k \neq m$, $x_m$ is another given one of said N sets of feature vectors, and $X_M$ and $X_K$ are a set of all similar feature vectors computed on all training data.

Furthermore, the sub-step represented by decision block 118 can include determining whether I is less than a preselected threshold value for a given $x_k$. Selection of the threshold is discussed below with respect to the apparatus. Accordingly, complementary features can be combined for maximum benefit. It should be appreciated that the mutual information I is a measure which estimates the amount of information between two random variables in bits, that is, the amount of information which one random variable contains about the other. It can be defined as the relative entropy between the joint distribution and the product of the individual distributions of the two random variables which are being considered. In order to decide which feature vectors or which dimensions of feature vectors should be combined, the quantity I is computed in accordance with the foregoing equation. In the field of speech recognition, for example, $x_m$ could be a mel cepstra feature vector and $x_k$ could be a PLP feature vector. The quantity I estimates the amount of information which is already contained in $x_m$ about $x_k$. Accordingly, new feature vectors are selected for inclusion such that the quantity I is less than a predetermined threshold. In this way only complementary features which contain significant new information are combined, to obtain maximum benefit. This approach could also be extended to the selection of the dimensions from the selected feature vectors to further optimize the amount of complementary information. I could be computed at an additional level where the dimensions are also selected in the same manner as the features. Computation of the quantities in the equation defining I can be approximated, for example, with techniques which employ histograms to estimate the probability distributions.

In some embodiments of the invention, the observation vectors can be frames of speech and the feature vectors can be acoustic feature vectors. The pattern can be a time waveform corresponding to speech, such that $x_1, x_2, \ldots x_N$ can be represented as $\vec{x}(t)$, where t is time. The acoustic feature vectors could include at least two of mel cepstra, LDA, centroids, perceptive linear predictions (PLP), LPC cepstra, multiple spectral bands, maximum likelihood linear transformations (MLLT), principal component analysis (PCA), and vocal tract length normalized features (VTL), and in fact, any linear transformations or nonlinear transformations.

The present method can be performed on as few as two sets of feature vectors, such that N=2, or on more than two sets of feature vectors, such that N>2.

The sum of all the weights $w_1, w_2, w_N$, can preferably be substantially equal to 1, and more preferably exactly equal to 1. All of the weights can be substantially or exactly equal, but in some cases at least some of the weights need not be equal. For example, certain weights can be increased or decreased depending on the relative confidence in the corresponding sets of feature vectors.

Figure 4:
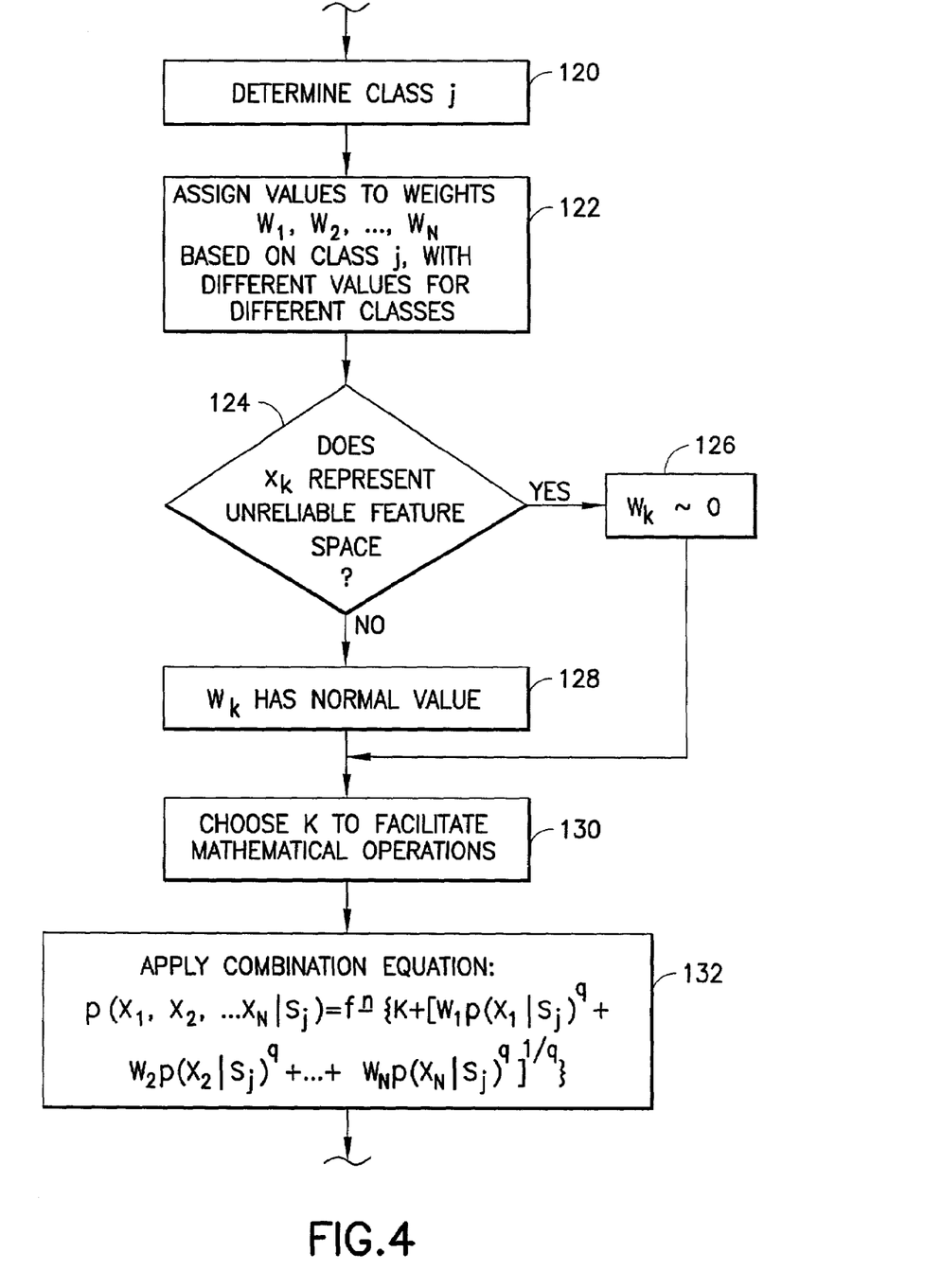
FIG. 4 is a partial flow chart showing one manner of combining sets of feature vectors in accordance with the present invention.

Reference should now be had to FIG. 4, which depicts a flow chart showing optional details for combining the N sets of feature vectors per block 10 in FIG. 2. Referring to block 122, different values can be assigned to the weights $w_1$, $w_2, \ldots w_N$ based on the class j which is being evaluated, with different values being used for different classes. It will be appreciated that before assigning the values, a determination can be made as to what class j is being dealt with, per block 120.

Another optional sub-step in the combination of the feature vectors is reflected at decision block 124 and computation blocks 126 and 128 in FIG. 4. A decision can be made whether $x_k$ represents an unreliable feature space under certain predetermined conditions. If this is the case, $x_k$ can be "shut off" by setting its corresponding weight $w_k$ to a value of substantially, or exactly, 0, as shown in block 126. If the given feature space is not unreliable under the predetermined conditions, $w_k$ can receive its normal value per block 128.

It will be appreciated that the constant K can be arbitrarily chosen in order to facilitate mathematical operations, and may even be assigned a value of 0. For values of the probabilities which are not very small (for example, from 0.1 upwards), a value of K=0 can be employed, for example, and the function $f\_"$ in Equation (1) can be the exponential function exp( ). For very small probability values (for example, on the order of 0.0001, 0.00015, etc.), a value of K=100 can be employed, for example, and the function $f\_"$ in equation (1) can be the logarithmic function log( ). Any base can be used for the logarithmic function. At present, it is believed preferable to use the exponential function when the probability values are not very small and the logarithmic function when such values are very small; however, use of either type of function throughout the operative range of probability values is within the scope of the invention.

The value of q in the aforementioned combination equation can be any suitable value, and a value of q substantially equal to 1 has been found to be advantageous. In one aspect of the invention, q can approach infinity, such that the Equation (1) reduces to:

$$p(x_1, x_2, \ldots x_N|s_j) = f\_"\{K + \max\{[p(x_1|s_j)^q, p(x_2|s_j)^q, \ldots p(x_N|s_j)^q]^{1/q}\}\}. \quad (3)$$

Finite values of q can be thought of as providing a weighted likelihood combination, while when q tends to infinity, the process can be thought of as one of rank-based state selection.

Figure 5:
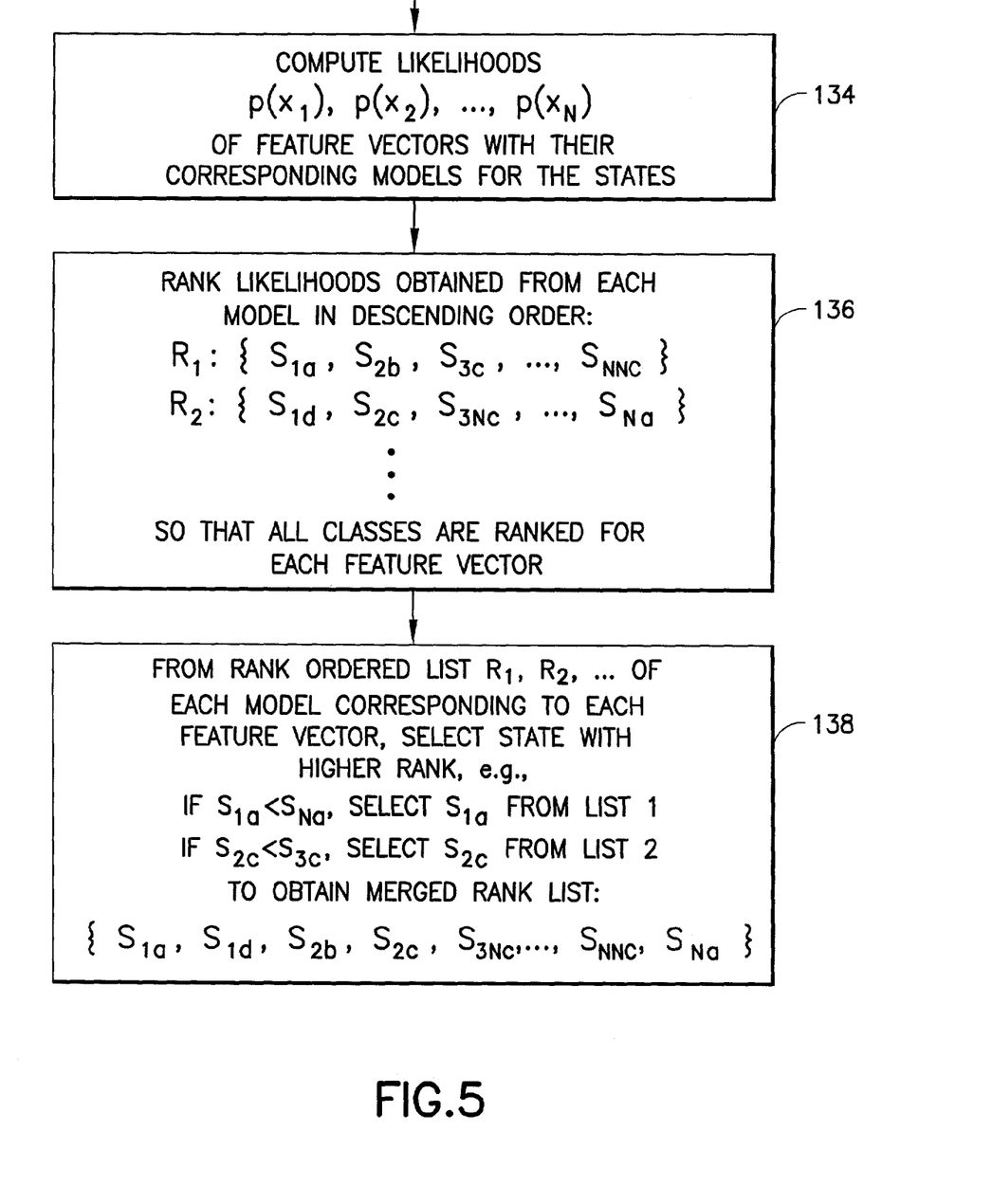
FIG. 5 is a partial flow chart showing another method of combining sets of feature vectors in accordance with the present invention.

Reference should now be had to FIG. 5, which depicts a partial flow chart showing optional sub-steps which can be performed during the combination of the feature vectors in block 110 of FIG. 1. Specifically, all classes can be ranked for each of the feature vectors, per block 136, and then a merged rank list can be generated by picking that class from among each of the feature vectors which yields the highest rank. This permits discriminating among the correct and incorrect ones of the classes. As shown in block 136, we can rank the likelihoods obtained from each model in a descending order such that all the classes are ranked for each feature vector. Per block 138, one can select the state with the highest rank from the rank ordered list $R_1, R_2, \ldots$ of each model corresponding to each feature vector so as to obtain the merged rank list. For example, if $s_{1a} < s_{Na}$, we select $s_{1a}$ from list 1. If $s_{2c} < s_{3c}$, we select $s_{2c}$ from list 2. We adopt the notation $s_{ab}$ where a is position and b is class ID. We can deal with N lists of states for the N feature vectors. In FIG. 5, the rank ordered lists $R_1$ and $R_2$ yield a merged list $\{s_{1a}, s_{1d}, s_{2b}, s_{2c}, s_{3NC}, \ldots, s_{NNC}, s_{Na}\}$ where NC is the number of classes. Per block 134, prior to performing the computations in blocks 136 and 138, we can compute the likelihoods $p(x_1), p(x_2), \ldots p(x_N)$ of the feature vectors with their corresponding models for the states.

As will be discussed further below, an apparatus for implementing the aforementioned method steps can be implemented in hardware, software, or in a combination of both hardware and software. In one preferred embodiment, the method steps can be carried out using a suitably programmed general purpose digital computer, of a kind well known to those of skill in the art. Accordingly, it will be appreciated that the present invention contemplates a program storage device readable by machine, tangibly embodying a program of instructions executable by the machine to perform the method steps for robust pattern recognition as set forth above (or any subset thereof).

Figure 6:
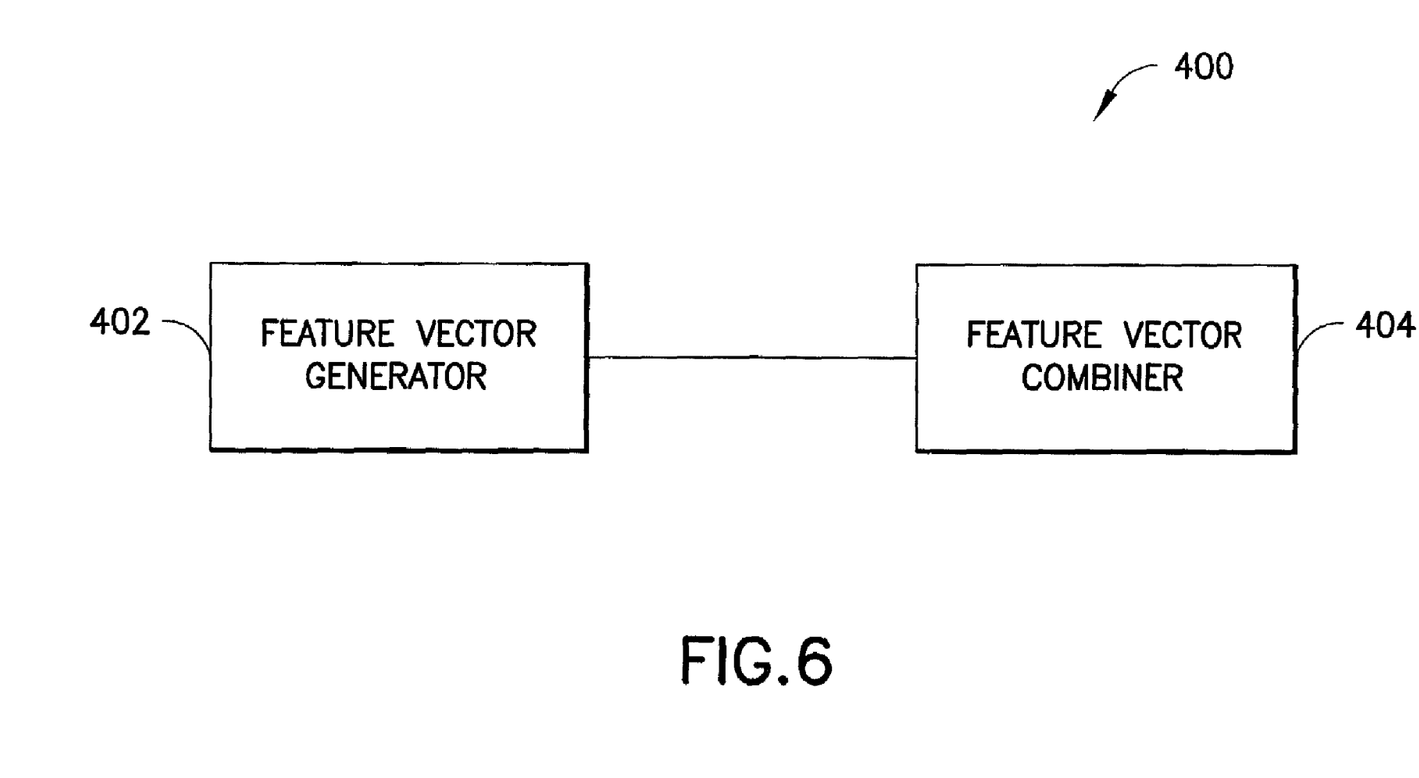
FIG. 6 is a block diagram of an apparatus for robust pattern recognition in accordance with the present invention.

Attention should now be given to FIG. 6 which depicts an apparatus, designated generally as 400, for robust pattern recognition, in accordance with the present invention. The apparatus 400 includes a feature vector generator 402 which generates N sets of feature vectors $x_1, x_2, \ldots x_N$ from a set of observation vectors which are indicative of a pattern which it is desired to recognize. At least one of the sets of feature vectors is different than at least one other of the sets of feature vectors, and is preselected for the purpose of containing at least some information which is complementary to that found in the at least one other of the sets of feature vectors. Apparatus 400 also includes a feature vector combiner 404 which combines the N sets of feature vectors in a manner to obtain an optimized set of feature vectors which best represents the pattern. The combining is performed via one of a weighted likelihood scheme and a rank-based scheme, as discussed above with respect to the method. Again, combination is preferably done in accordance with Equation (1) above.

Figure 7:
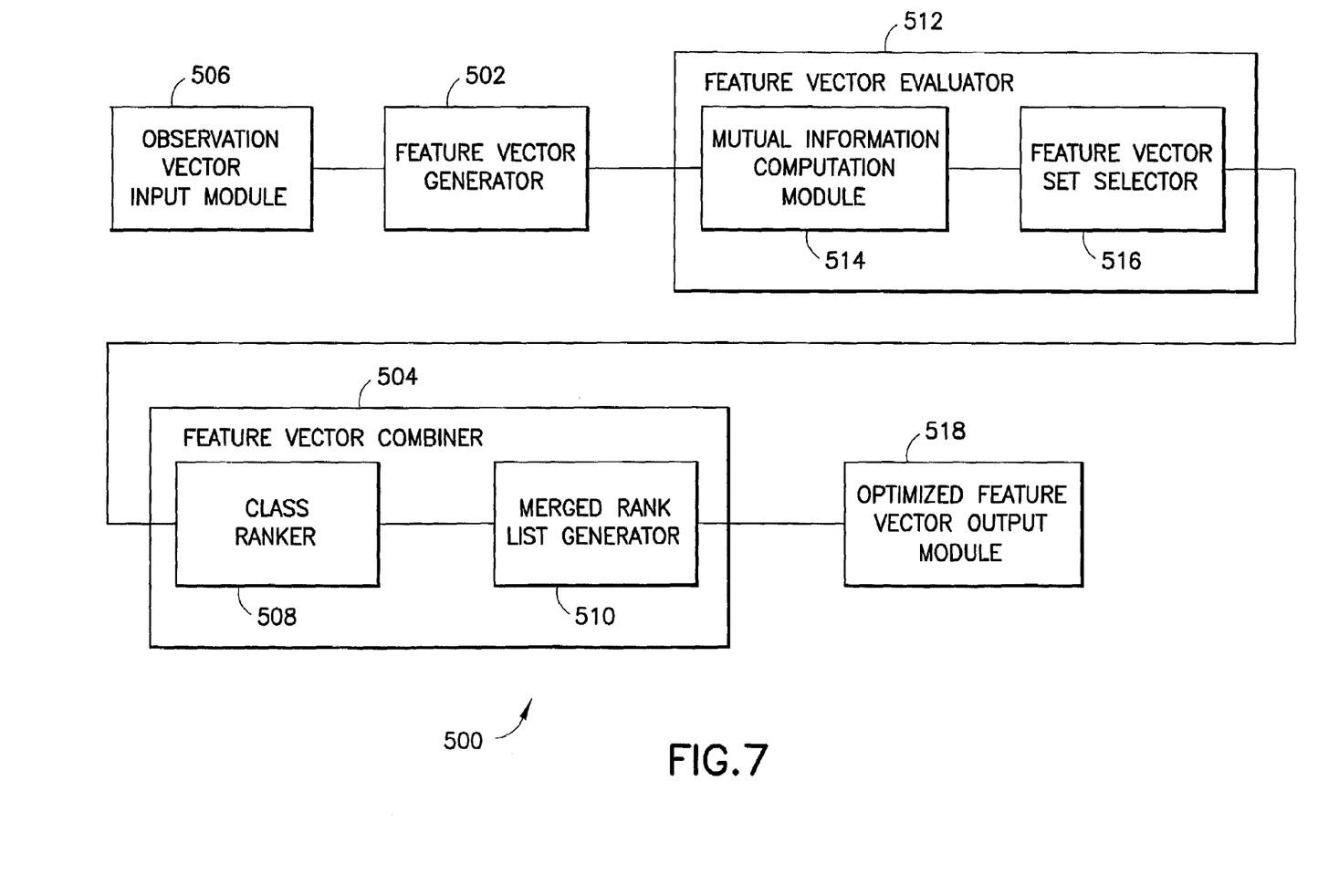
FIG. 7 is a block diagram similar to FIG. 6, showing certain optional, more detailed elements which can be present in some aspects of the invention.

Reference should now be had to FIG. 7 which shows an apparatus 500 similar to apparatus 400 depicted in FIG. 6, but having additional, optional features, in which similar elements have received the same reference character incremented by 100. The aforementioned observation vectors can be obtained from an observation vector input module 506. Such module could be any form of volatile or nonvolatile computer memory holding data representative of the observation vectors, and could, if desired, include appropriate hardware to directly capture the observation vectors and supply them to the feature vector generator. For example, an appropriate microphone and sound board could be included for acoustic applications of the invention, and an appropriate optical input device could be included for handwriting recognition or optical character recognition embodiments of the invention.

The feature vector combiner 504 can optionally include a class ranker 508 which ranks all classes for each of the feature vectors. The feature vector combiner 504 can also optionally include a merged rank list generator 510 which generates a merged rank list by picking that class from among each of the feature vectors which yields the highest rank. Accordingly, it is possible to discriminate among correct and incorrect ones of the classes.

The apparatus 500 can, if desired, include a feature vector evaluator 512 which evaluates a given one of the feature vectors via information theory-based techniques to determine whether the given one of the feature vectors contains valuable information and should be combined. The feature vector evaluator 512 can, in turn, include a mutual information computation module 514 and a feature vector set selector 516. The mutual information computation module 514 can be configured to compute mutual information, I, in accordance with Equation (2) above.

Furthermore, the feature vector set selector 516 can be configured to select $x_k$ such that I is less than a preselected threshold, such that complementary features are combined for maximum benefit. In practice, various values of the threshold can be tried to determine a local minima for error rate. The apparatus 500 can be employed in any type of pattern recognition problem. In one application of the invention, the observation vectors are frames of speech and the feature vectors are acoustic feature vectors. In this case, the pattern is a time waveform corresponding to speech, such that $x_1, x_2, \ldots x_N$ can be represented as $\vec{x}(t)$, where t is time. In this case, the acoustic feature vectors could include, for example, at least two of the following: mel cepstra, LDA, centroids, perceptive linear predictions (PLP), LPC cepstra, multiple spectral bands, maximum likelihood linear transformations (MLLT), principal component analysis (PCA), and vocal tract length normalized features (VTL), or, in fact, any linear or nonlinear transformations.

The apparatus can be configured to operate on as few as two feature vectors, i.e., N=2. Alternatively, more than two vectors can be employed. The sum of all the weights $w_1$, $w_2, \ldots w_N$ is preferably substantial equal to 1, and most preferably exactly equal to 1. The weights can all be substantially or exactly equal, or alternatively, at least some of the weights may not be equal to each other. The feature vector combiner 504 can be configured to employ different weights for different classes. Further, at least one of the weights may be set to substantially zero, or exactly zero, so as to shut off a given feature space due to unreliability of such feature space under certain conditions. For example, if it was found that a certain feature space did not give reliable results with a noisy background, its weight could be set to substantially or exactly zero, or could be reduced by a desired amount but not set to zero.

The normalization constant K can be arbitrarily chosen to facilitate mathematical operations, and can even be assigned a value of zero if desired. The real number q which corresponds to the desired combination function can take on any desired value. In some embodiments of the invention, which may be thought of as a weighted likelihood combination, q can have a finite value. A value of 1 has been found to be suitable, but as noted with respect to the method, other values are within the scope of the invention. In other embodiments of the invention, q can be allowed to approach infinity. In the latter case, the quantity $p(x_1, x_2, \ldots x_N|s_j)$ can be calculated according to Equation (3) above. This latter condition corresponds to a rank-based state selection.

The optimized set of feature vectors obtained from the feature vector combiner can be sent to an optimized feature vector output module 518. Such module can be simply a memory location or other hardware device or software routine which transfers the optimized feature vector to a desired location, such as the input to a suitable pattern recognition engine, including a speech recognition engine, handwriting recognition engine, optical character recognition engine, or the like.

It should be appreciated that the elements of the apparatus depicted in FIG. 5 can be implemented in hardware, software, or a combination of hardware and software. At present, it is believed that they are preferably implemented by programming a suitable general purpose digital computer. Suitable input and output hardware can be provided for the computer. However, it should be noted that, in the alternative, suitable circuitry could be employed, including application specific integrated circuits (ASICs), circuits employing discrete components, or a combination of both. Circuitry implementations may be preferable in some cases, such as handheld devices, for greater speed. Further, analog computer devices could be employed to carry out appropriate method steps of the invention or to implement appropriate apparatus elements.

EXAMPLE

Certain additional comments will now be presented regarding an illustrative application of the present invention to speech recognition. The IBM Continuous speech recognition system can be used with the present invention and uses a set of phonetic baseforms and context dependent models. These models are built by constructing decision tree networks that query the phonetic context to arrive at the appropriate models for the given context. A decision tree is constructed for every sub-phonetic unit. Each terminal node (leaf) of the tree represents a set of phonetic contexts, such that the feature vectors observed in these contexts were close together as defined by how well they fit a diagonal Gaussian model. The feature vectors at each terminal node are modeled using a mixture of Gaussians with each Gaussian having a diagonal covariance matrix. The leaves of the decision tree correspond to context-dependent HMM states.

The IBM system also uses a rank-based decoding scheme as discussed in Bahl et al., "Robust-methods for using context-dependent features and models in a continuous speech recognizer," ICASSP 1994, Vol. 1, pp 533–36. The rank r (s,t) of a state s at time t is the rank order of the likelihood given the mixture model of this state in the sorted list of likelihoods computed using all the models of all the states in the system and sorting them in descending order. In such a system, the output distributions on the state transitions of the model are expressed in terms of the rank of the state. Each state transition has a probability distribution on ranks which typically has a peak at rank one and rapidly falls off to low probabilities for higher ranks.

This representation overcomes problems associated with the large fluctuations in the likelihood scores seen in continuous parameter HMMs. Also, if the observations for a few time frames are outliers for the correct mixture model, the penalty is not so high that the correct word comes out with a very low likelihood. This makes the rank-based system more robust compared to continuous parameter HMMs.

When there are several feature vectors from different feature spaces representing an observation, a different set of Gaussian mixture models are trained for each of these feature spaces, while keeping the context-dependent states the same. During decoding, the likelihoods computed from the Gaussian mixture models are used to rank order the states to form an ordered list of states. When there is more than one feature stream, there is one ordered list of states for each feature stream. The problem of combining/selecting feature spaces now becomes the problem of combining the ordered lists in a manner that best represents the acoustics at any given time frame.

Let $\vec{x}(t)=(x_1, x_2, \ldots x_n)$ be the N observed feature vectors at time t, where N is the number of feature spaces used to represent the speech signal. The variable $s_j$ is the jth state of the HMM. In order for the correct leaf to occupy the top rank positions, the probability given by:

$$p(s_j|x_1, \ldots xN)=(p(x_1, \ldots x_N|s_j))/(p(x_1, \ldots x_N)) \quad (4)$$

has to be maximized. It has been observed that recognition accuracy gets better when the correct leaves occupy the top rank positions more number of times.

The term $p(x_1, \ldots x_N|s_j)$ represents the combined feature space. Assuming that the feature vectors from the N streams are independent, Equation (4) becomes $$p(s_j|x_1, \ldots x_N) = (p(x_1|s_j)p(x_2|s_j) \ldots p(x_N|s_j))/(p(x_1, \ldots x_N)) \quad (5)$$

In practice, we maximize $p(x_1|s_j)p(x_2|s_j) \ldots p(x_N|s_j)$, which can be viewed as a function of a set of weights, $\{w_n\}$, operating on $p(x_N|s_j)$, i.e., $$f(w_1 p(x_1|s_j), w_2 p(x_2|s_j), \ldots w_N p(x_N|s_j)) \quad (6)$$

with the constraint:

$$\Sigma w_n = 1, \text{ for all n, sum taken between the limits of } n=1 \text{ to } N. \quad (7)$$

In order to boost the rank of the correct leaf, we need to boost the combined likelihood of all feature vectors from all the streams at any given time. One approach involves the averaging of the log posterior probabilities from the individual acoustic models trained on the separate feature streams. A second approach for combining the likelihoods of multiple feature streams uses the well-known sum and product rules. In P. Beyerlin, "Discriminative Model Combination," ICASSP '98, pp 481–84, Seattle, May 1998, a discriminative model combination approach that optimally combines several acoustic and language models has been suggested. Several methods for performing feature selection in accordance with the present invention are set forth herein. The combination of models/features can be implemented in both the rank domain or in the raw feature vector space. It should be emphasized here that while one of the methods serves as a means to merge feature streams, the other selects the best feature stream. Since both these methods operate at the frame level, no specific synchronization is needed at any sub-unit level, such as the phone, word or syllable level.

In a continuous-density HMM system, the context-dependent states of the HMM are derived from decision trees and modeled using Gaussian mixture densities. Maximum-likelihood is used as the criterion to select the best model from a set of n models according to equation (1) above. Note that $p(x_1|s_j), \ldots p(x_N|s_j)$ are the likelihoods from the multiple streams for the state $s_j$.

The different values of q: 0, 1, ... ∞ represent different combination functions. The weights reflect the confidence in the quality of the states of the streams being merged. Hence, they could even be zero under certain noisy conditions, which would imply a form of feature selection. These weights can be tied across states and estimated using optimization techniques. We use this representation, because in the limit, when q goes to ∞, this expression reduces to a max operation and this is the theory behind the rank-based state selection scheme.

The rank r (s,t) of a state s at time t is the rank order of the likelihood given the mixture model of this leaf in the sorted list of likelihoods computed using all the models of all the leaves in the system and sorting them in descending order. The more number of times a correct leaf appears in the top rank positions, the better the recognition accuracy. In order to improve the rank of the correct state, its likelihood score has to be boosted up relative to other leaves. The emphasis here is on the selection of appropriate features that are robust to certain acoustic conditions and also model certain phonetic sounds better. Hence, we wish to pick the feature stream for which a state scores the topmost rank.

From Equation 1, it can be seen that when q tends to ∞, this reduces to a max operation given by Equation (3). This represents the choice of the feature stream as the one with the best rank in the ranking scheme described above.

In the weighted likelihood based selection scheme, we used uniform weights as an initial choice for running our experiments and q=1. Other choices of q did not yield any further improvements in recognition accuracy in the exemplary cases studied. Hence, for a two-stream input, the weights were chosen to be 0.5 and maintained constant throughout the test utterances. In the rank-based method, first, an n-best rank list for each stream is generated. For each observation vector the states are ordered based on the rank of the states. Next, the merged rank list from all the feature streams is generated by picking the state from the feature stream that yields the highest rank. This results in several states with the same rank in the n-best rank list. Although the correct state is ranked much lower in one feature space, an alternative feature space may be able to capture its characteristic information causing it to be ranked higher. This scheme picks the better feature stream based on the rank positions, thereby introducing discrimination between correct and incorrect states. The weighted-likelihood based method boosts the state likelihoods and provides robustness.

The training data used for all the systems built from the four different feature streams was the same. An in-house data base consisting of 100 hours of training data collected from 2000 speakers was used. The speaker adapted systems used to test read speech were adapted on 30 mins. of read speech from each speaker, while those used to test spontaneous speech were adapted using 30 mins. of spontaneous speech.

All systems had approximately 3000 context-dependent HMM states. The speech recognition system uses an alphabet of 52 phones. Each phone is modeled with a 3-state left-to-right HMM. Systems with 160K Gaussians and 245K Gaussians were built for comparing the recognition accuracies obtained using the feature selection scheme with models with a large number of parameters.

The basic acoustic front-end uses a cepstral feature vector extracted every 10 ms, along with Δ+ΔΔ and sentence based cepstra mean normalization. The LDA feature space included 9 frames of cepstral vectors spliced together and the top 40 dimensions with the largest eigen values were selected. The centroid-based feature stream (further details are available in K. Paliwal, "Spectral Subband Centroid Features for Speech recognition," ICASSP '98 pp. 617–20, Seattle, May, 1998) computes the centroids in different frequency bands, based on the formula:

$$C_m = (\int f w_m(f) P_\gamma(f) df)/(\int w_m(f) P_\gamma(f) df) \quad (8)$$

where $C_m$ is the centroid in the mth subband with $l_m$ and $h_m$ being the lower and higher frequencies of the mth subband, $P_\gamma(f)$ is the power spectrum, γ is a constant controlling the dynamic range of the power spectrum, and each integral is a definite integral evaluated between the lower limit of $l_m$ and the upper limit of $h_m$. These features are known to be robust to noise and similar to formant frequencies. As can be seen from Table 3, these are supplementary to the traditional cepstral feature vectors. The enhanced likelihood computation scheme (further details are available in P. deSouza et al., "Enhanced Likelihood Computation Using Regression," Eurospeech '99, pp. 1699–1702, Budapest, 1999), which incorporates forward and backward prediction errors into the regular cepstral stream, was the fourth stream used in this example. This feature space captures the correlation between adjacent vectors using regression. The regression predicts the neighboring frames of the current frame of speech. The incorporation of prediction error likelihoods into the overall likelihood computation improves the rank position of the correct leaf, without increasing the complexity of the HMMs.

Different test data sets were used for the example. They can be broken down into read speech (BOS), higher perplexity read speech from both native and non-native speakers (NRR), spontaneous speech (SPO), read speech from a variety of domains (LMNEW) and spelling data (SPL). All the test sets include both native and non-native speakers. The BOS data set is an hour of speech from 10 speakers, the NRR data set includes over 2 hours of speech from 15 speakers, and the SPO test set includes an hour of speech from each of the 10 speakers. The LMNEW test set contains 5 speakers and the SPL test set contains 10 speakers.

Experiments were performed using speaker adapted and speaker independent models. Table 1 summarizes the results using speaker dependent models using both methods of feature selection. The weights chosen for the likelihood-based scheme were 0.5 and constant. It can be seen that the inventive methods outperform ROVER's performance on these data sets. The extra computations resulting from the additional feature extraction and selection process add approximately an additional 15% to the decoding time. This is considerably less when compared to a combination scheme after several decoding passes. Table 2 tabulates the use of cepstral and LDA feature streams using speaker independent models. It also compares the performance of the two selection schemes with a system built with many more parameters (160 K Gaussians) than the combined system (effectively 80 K Gaussians). There was negligible improvement in accuracy even if a system trained with 245 K Gaussians was used.

TABLE 1

Error Rates using cepstral and LDA feature spaces and both methods of selection with speaker adapted models.

| | Ind. Feature Spaces Error Rates | | Feature Space Selection Error Rates | |
| --- | --- | --- | --- | --- |
| | Cepstra Baseline | LDA Baseline | Liks. Based | Rank Based |
| BOS | 8.49 | 7.33 | 6.38 | 6.33 |
| NRR | 8.71 | 7.78 | 7.3 | 7.28 |
| SPT | 21.25 | 17.79 | 16.8 | 16.8 |
| LMNEW | 12.1 | 10.04 | 9.3 | 9.1 |

TABLE 2

Error Rates using cepstral and LDA features, rank-based selection, ROVER, and a large parameter system with speaker independent models.

| | Cepstra Baseline | LDA Baseline | Rank Based | Rover | Large System |
| --- | --- | --- | --- | --- | --- |
| BOS | 11.03 | 9.45 | 8.39 | 8.7 | 8.33 |
| NRR | 15.79 | 13.25 | 12.1 | 12.9 | 11.99 |
| SPT | 25.53 | 22.7 | 21.25 | — | 20.9 |
| SPL | 5.96 | 4.28 | 3.4 | — | — |

In an effort to study more feature streams, two other feature streams, namely, centroid and prediction-error based features were evaluated. The systems built using these streams were trained only on a subset of the original training data in order to speed up the training procedure. This explains the difference in the baseline error rate of the cepstral system between Table 2 and Table 3. Table 3 tabulates the results of the feature selection scheme on the BOS test set using centroid, cepstral and regression-based features. The combination of cepstral and centroid feature spaces does not provide a significant improvement in accuracy, while the combination of all 3 feature spaces brings the error rate down to 10. 1%. However, it remains to be seen if the same error rate can be achieved by combining the cepstral and prediction error based feature spaces or the centroid and prediction error based feature spaces alone.

In all cases, there is a substantial increase in recognition accuracy over the best system. This selection scheme was also used for generating transcriptions that would be subsequently used for adaptation (MAP and MLLR). On the SPT task, this provided an additional 5% relative improvement in recognition accuracy over the use of any single feature stream.

The foregoing example has presented two methods for dynamically selecting feature spaces during recognition. Instead of explicitly selecting the features from the individual streams, the HMM states are selected based on two sets of criteria.

TABLE 3

Error Rates using cepstral, centroid and prediction-error augmented cepstral feature spaces and rank-based selection with speaker independent models.

| System | Error Rates |
| --- | --- |
| Cepstra | 11.54 |
| Centroid | 12.56 |
| Pred.err | 10.4 |
| Cepstra + Centroid | 10.9 |
| Cepstra + Centroid + Pred.err | 10.1 |

These methods provide a reduction in error rate between 8% to 15% relative across a wide variety of LVCSR tasks, both in speaker adapted and speaker independent scenarios. Methods to optimally estimate the weights are also presented. With just the additional cost of computation required by the additional feature spaces, it is possible to achieve recognition accuracies that are higher than those attained by ASRs trained on those individual streams. Furthermore, this approach is as good as training ASRs with a large number of parameters and hence does not suffer from sparse training data issues. As the results have demonstrated, when the feature streams contain complimentary information, it is possible to switch between them in a manner that boosts recognition accuracy.

It will be appreciated that the foregoing example is merely designed to illustrate a specific application of the present invention to speech recognition, and should not be taken as limiting. A host of further applications and modifications are possible for both speech recognition and other pattern recognition tasks. For example, the weights used for merging different streams can be changed dynamically and tied to specific phones or syllables. They can also be tied to acoustically similar segments, where a segment is defined as a unit of speech (not necessarily decided on phones, context dependent subphonetic states or syllables). These segments are similar to those used in segmental models, such as are described in the article "A Stochastic Segment Model for Phoneme based Continuous Speech Recognition" by Ostendorf and Roukos, IEEE Transactions on Acoustics, Speech and Signal Processing, v. 37, n. 12, Dec. 1989, at pp. 1857–69. Thus, it will be appreciated that use in segmental models is possible. Further, the weights can also be estimated statistically from the training data based on an approach similar to the discriminative model described in the paper by P. Beyerlin entitled "Discriminative Model Combination," as archived at pages 481–84 of the proceedings of ICASSP '98 held in Seattle, Wash. in May 1998. In such case, the optimization function could now include the rank distribution function.

It should be appreciated that the present invention is not limited to hidden Markov models, and can be employed with other schemes, such as, for example, dynamic time warping. Examples of conditions under which robustness is required include noisy backgrounds, non-native English speakers, and the like. At present, it is believed best to combine at the frame level, for speech recognition applications. Accordingly, in a preferred speech recognition approach, the set of observations is a frame. However, it is possible to combine at a higher level (although not believed optimal). Accordingly, in order of decreasing desirability, the set of observations in a speech recognition context could be a frame, a phone, a syllable, or even a word.

In conclusion, the present invention has broad applicability to any situation requiring robust pattern recognition, including recognition of speech, handwriting or optical characters under challenging conditions. The particular attractiveness and suitability of the present invention for speech recognition arises from the fact that the inventive combination achieves the same or better robustness and recognition accuracy than that which would be achieved by separately using the systems being combined. This implies reduced computational cost and memory requirements. Consequently, it is suitable for handheld devices (pervasive computing) and telephony conversational systems. The advantages of the present invention as applied to speech recognition include increased recognition accuracy, robustness to car noise/background noise, reduced computational costs, ability to merge with other streams, including non-audio streams such as video, and reduced memory usage since only one merged list needs to be stored.

While there have been described what are presently believed to be the preferred embodiments of the invention, those skilled in the art will realize that various changes and modifications can be made to the invention without departing from the spirit of the invention, and it is intended to claim all such changes and modifications as fall within the scope of the invention.

What is claimed is:

1. A method for robust pattern recognition, comprising the steps of:

(a) generating N sets of feature vectors $x_1, x_2, \ldots x_N$ from a set of observation vectors which are indicative of a pattern of an analog input signal converted to electronic form by a transducer which it is desired to recognize, at least one of said sets of feature vectors being different than at least one other of said sets of feature vectors and being preselected for purposes of containing at least some complimentary information with regard to said at least one other of said sets of feature vectors; and (b) combining said N sets of feature vectors in a manner to obtain an optimized set of feature vectors which best represents said pattern, said combining being performed in accordance with the equation:

$$p(x_1, x_2, \ldots x_N | s_j) = f\_^n \{K + [w_1 p(x_1 | s_j)^q + w_2 p(x_2 | s_j)^q + \ldots + w_N p(x_N | s_j)^q]^{1/q}\}$$

where:

$f\_^n$ is one of an exponential function exp( ) and a logarithmic function log( ), $s_j$ is a label for a class j, N is greater than or equal to 2, $p(x_1, x_2, \ldots x_N | s_j)$ is conditional probability of feature vectors $x_1, x_2, \ldots x_N$ given that they are generated by said class j, K is a normalization constant, $w_1, w_2, \ldots w_N$ are weights assigned to $x_1, x_2, \ldots x_N$ respectively according to confidence levels therein; and q is a real number corresponding to a desired combination function.

2. The method of claim 1, wherein $f\_^n$ is said logarithmic function.

3. The method of claim 2, wherein K is approximately 100.

4. The method of claim 1, wherein $f\_^n$ is said exponential function.

5. The method of claim 4, wherein step (b) further comprises:

ranking all classes for each of said feature vectors; and generating a merged rank list by picking that class from among each of said feature vectors which yields a highest rank;

whereby it is possible to discriminate among correct and incorrect ones of said classes.

6. The method of claim 4, further comprising the additional step of, prior to step (b), evaluating a given one of said feature vectors, $x_k$, via information theory-based techniques to determine whether said given one of said feature vectors contains valuable information and should be combined.

7. The method of claim 6, wherein said evaluating step comprises the sub-steps of:

computing mutual information, I, in accordance with:

$$I(x_m, x_k) = \Sigma\Sigma((p(x_m, x_k))/(p(x_m)p(x_k)))$$

where:

the first summation is for $x_m \in X_M$ and the second summation is for $x_k \in X_K$, k≠m, $x_m$ is another given one of said N sets of feature vectors, and $X_M$ and $X_K$ are a set of all similar feature vectors computed on all training data; and selecting said given feature vector, $x_k$, when I is less than a preselected threshold; whereby complimentary feature vectors are combined for maximum benefit.

8. The method of claim 4, wherein:

said observation vectors are frames of speech;

said feature vectors are acoustic feature vectors; and said pattern is a time waveform corresponding to speech, such that $x_1, x_2, \ldots x_N$ can be represented as $\vec{x}(t)$, where t is time.

9. The method of claim 8, wherein said acoustic feature vectors include at least two of mel cepstra, LDA, centroids, perceptive linear predictions (PLP), LPC cepstra, multiple spectral bands, linear transformations, nonlinear transformations, maximum likelihood linear transformations (MLLT), principal component analysis (PCA), and vocal tract length normalized features (VTL).

10. The method of claim 4, wherein N=2.

11. The method of claim 4, wherein N>2.

12. The method of claim 4, wherein the sum of all of said weights $w_1, w_2, \ldots w_N$ is substantially equal to 1.

13. The method of claim 4, wherein all of said weights $w_1, w_2, \ldots w_N$ are substantially equal.

14. The method of claim 4, wherein at least some of said weights $w_1, w_2, \ldots w_N$ are not equal.

15. The method of claim 4, wherein step (b) comprises the sub-step of employing different weights for different classes.

16. The method of claim 4, wherein step (b) includes the sub-step of assigning to at least one of said weights a value of substantially zero so as to shut off a given feature space due to unreliability of said given feature space under predetermined conditions.

17. The method of claim 4, wherein step (b) further comprises the sub-step of arbitrarily choosing K to facilitate mathematical operations.

18. The method of claim 4, wherein K is assigned a value of zero and $f\_''$ is said exponential function.

19. The method of claim 4, wherein q is substantially equal to 1.

20. The method of claim 4, wherein q approaches infinity, such that:

$$p(x_1,x_2,\ldots x_N|s_j)=f\_''\{K+\max\{[p(x_1|s_j)^q, p(x_2|s_j)^q, \ldots p(x_N|s_j)^q]^{1/q}\}\}.$$

21. The method of claim 1, wherein said meaningful input is articulated sound converted from mechanical energy to electrical energy.

22. The method of claim 1, wherein said meaningful input is linguistic characters.

23. The method of claim 1, wherein said meaningful input is representation of human thought.

24. An apparatus for robust pattern recognition, said apparatus comprising:
(a) a feature vector generator which generates N sets of feature vectors $x_1, x_2, \ldots x_N$ from a set of observation vectors of an analog input signal converted to electronic form by a transdycer which are indicative of a pattern which it is desired to recognize, at least one of said sets of feature vectors being different than at least one other of said sets of feature vectors and being preselected for purposes of containing at least some complimentary information with regard to said at least one other of said sets of feature vectors; and
(b) a feature vector combiner which combines said N sets of feature vectors in a manner to obtain an optimized set of feature vectors which best represents said pattern, said combining being performed in accordance with the equation:

$$p(x_1,x_2,\ldots x_N|s_j)=f\_''\{K+[w_1 p(x_1|s_j)^q+w_2 p(x_2|s_j)^q+\ldots+w_N p(x_N|s_j)^q]^{1/q}\}$$

where:
$f_n$ is one of an exponential function exp( ) and a logarithmic function log( ),
$s_j$ is a label for a class j,
N is greater than or equal to 2,
$p(x_1, x_2, \ldots x_N|s_j)$ is conditional probability of feature vectors $x_1, x_2, \ldots x_N$ given that they are generated by said class j,
K is a normalization constant,
$w_1, w_2, \ldots w_N$ are weights assigned to $x_1, x_2, \ldots x_N$ respectively according to confidence levels therein; and
q is a real number corresponding to a desired combination function.

25. The apparatus of claim 24, wherein $f\_''$ is said logarithmic function.

26. The apparatus of claim 25, wherein K is approximately 100.

27. The apparatus of claim 24, wherein $f\_''$ is said exponential function.

28. The apparatus of claim 24, wherein said feature vector combiner further comprises:
a class ranker which ranks all classes for each of said feature vectors; and
a merged rank list generator which generates a merged rank list by picking that class from among each of said feature vectors which yields a highest rank;
whereby it is possible to discriminate among correct and incorrect ones of said classes.

29. The apparatus of claim 24, further comprising a feature vector evaluator which evaluates a given one of said feature vectors via information theory-based techniques to determine whether said given one of said feature vectors contains valuable information and should be combined.

30. The apparatus of claim 24, wherein said feature vector evaluator in turn comprises:
a mutual information computation module which computes mutual information, I, in accordance with:

$$I(x_m,x_k)=\Sigma\Sigma((p(x_m,x_k))/(p(x_m)p(x_k)))$$

where:
the first summation is for $x_m \in X_M$ and the second summation is for $x_k \in X_K$,
$k \neq m$,
$x_m$ is another given one of said N sets of feature vectors, and
$X_M$ and $X_K$ are a set of all similar feature vectors computed on all training data; and
a feature vector set selector which selects said given feature vector, $x_k$, when I is less than a preselected threshold;
whereby complimentary feature vectors are combined for maximum benefit.

31. The apparatus of claim 24, wherein:
said observation vectors are frames of speech;
said feature vectors are acoustic feature vectors; and
said pattern is a time waveform corresponding to speech, such that $x_1, x_2, \ldots x_N$ can be represented as $\vec{x}(t)$, where t is time.

32. The apparatus of claim 31, wherein said acoustic feature vectors include at least two of mel cepstra, LDA, centroids, perceptive linear predictions (PLP), LPC cepstra, multiple spectral bands, linear transformations, nonlinear transformations, maximum likelihood linear transformations (MLLT), principal component analysis (PCA), and vocal tract length normalized features (VTL).

33. The apparatus of claim 24, wherein N=2.

34. The apparatus of claim 24, wherein N>2.

35. The apparatus of claim 24, wherein the sum of all of said weights $w_1, w_2, \ldots w_N$ is substantially equal to 1.

36. The apparatus of claim 24, wherein all of said weights $w_1, w_2, \ldots w_N$ are substantially equal.

37. The apparatus of claim 24, wherein at least some of said weights $w_1, w_2, \ldots w_N$ are not equal.

38. The apparatus of claim 24, wherein said feature vector combiner is configured to employ different weights for different classes.

39. The apparatus of claim 24, wherein at least one of said weights is substantially zero so as to shut off a given feature space due to unreliability of said given feature space under predetermined conditions.

40. The apparatus of claim 24, wherein K is arbitrarily chosen to facilitate mathematical operations.

41. The apparatus of claim 24, wherein K is assigned a value of zero and $f\_{"}$ is said exponential function.

42. The apparatus of claim 24, wherein q is substantially equal to 1.

43. The apparatus of claim 24, wherein q approaches infinity, such that:

$$p(x_1, x_2, \ldots x_N | s_j) = f\_{"} \{K + \max\{[p(x_1|s_j)^q, p(x_2|s_j)^q, \ldots p(x_N|s_j)^q]^{1/q}\}\}.$$

44. A program storage device readable by machine, tangibly embodying a program of instructions executable by the machine to perform method steps for robust pattern recognition, said method steps comprising:

(a) generating N sets of feature vectors $x_1, x_2, \ldots x_N$ from a set of observation vectors of an analog input signal converted to electronic form by a transducer which are indicative of a pattern which it is desired to recognize, at least one of said sets of feature vectors being different than at least one other of said sets of feature vectors and being preselected for purposes of containing at least some complimentary information with regard to said at least one other of said sets of feature vectors; and (b) combining said N sets of feature vectors in a manner to obtain an optimized set of feature vectors which best represents said pattern, said combining being performed in accordance with the equation:

$$p(x_1, x_2, \ldots x_N | s_j) = f\_{"} \{K + [w_1 p(x_1|s_j)^q + w_2 p(x_2|s_j)^q + \ldots + w_N p(x_N|s_j)^q]^{1/q}\}$$

where:

$f_n$ is one of an exponential function exp( ) and a logarithmic function log( ), $s_j$ is a label for a class j, N is greater than or equal to 2, $p(x_1, x_2, \ldots x_N | s_j)$ is conditional probability of feature vectors $x_1, x_2, \ldots x_N$ given that they are generated by said class j, K is a normalization constant, $w_1, w_2, \ldots w_N$ are weights assigned to $x_1, x_2, \ldots x_N$ respectively according to confidence levels therein; and q is a real number corresponding to a desired combination function.

* * * * *

UNITED STATES PATENT AND TRADEMARK OFFICE
CERTIFICATE OF CORRECTION

| | | |
|---|---|---|
| PATENT NO. | : 7,054,810 B2 | Page 1 of 1 |
| APPLICATION NO. | : 09/968051 | |
| DATED | : May 30, 2006 | |
| INVENTOR(S) | : Yuqing Gao et al. | |

It is certified that error appears in the above-identified patent and that said Letters Patent is hereby corrected as shown below:

Title Page; item (75); should read;
Inventors: Yuqing Gao, Mount Kisco, NY (US);

Signed and Sealed this
Twenty-fourth Day of May, 2011

David J. Kappos
*Director of the United States Patent and Trademark Office*